United States Patent
Nagamura et al.

(10) Patent No.: US 11,478,405 B2
(45) Date of Patent: Oct. 25, 2022

(54) CELL PRESERVING VESSEL

(71) Applicants: The University of Tokyo, Tokyo (JP); JMS CO., LTD., Hiroshima (JP)

(72) Inventors: Tokiko Nagamura, Tokyo (JP); Motoki Nakano, Tokyo (JP)

(73) Assignees: THE UNIVERSITY OF TOKYO, Tokyo (JP); JMS CO., LTD., Hiroshima (JP)

( * ) Notice: Subject to any disclaimer, the term of this patent is extended or adjusted under 35 U.S.C. 154(b) by 32 days.

(21) Appl. No.: 16/626,740

(22) PCT Filed: Jun. 27, 2018

(86) PCT No.: PCT/JP2018/024440
§ 371 (c)(1),
(2) Date: Dec. 26, 2019

(87) PCT Pub. No.: WO2019/004304
PCT Pub. Date: Jan. 3, 2019

(65) Prior Publication Data
US 2020/0113779 A1   Apr. 16, 2020

(30) Foreign Application Priority Data

Jun. 27, 2017   (JP) .............................. JP2017-125601

(51) Int. Cl.
*A61J 1/10*   (2006.01)
*A61J 1/14*   (2006.01)
(Continued)

(52) U.S. Cl.
CPC ............... *A61J 1/10* (2013.01); *A61J 1/1475* (2013.01); *B29C 66/53262* (2013.01); *B29L 2031/7148* (2013.01)

(58) Field of Classification Search
CPC ......... A61J 1/10; A61J 1/1475; A01N 1/0268; A01N 1/0263; B29C 66/53262; B29L 2031/7148
See application file for complete search history.

(56) References Cited

U.S. PATENT DOCUMENTS 3,211,144 A * 10/1965 Nehring .................... A61J 1/10
604/409
3,460,742 A * 8/1969 Langdon ................ A61B 50/30
206/439

(Continued)

FOREIGN PATENT DOCUMENTS

EP   2724703 A1   4/2014
JP   S-584567 A   1/1983
(Continued)

OTHER PUBLICATIONS

Encyclopaedia Britannica ("polyolefin," https://www.britannica.com/science/polyolefin, accessed Mar. 3, 2012, published Jul. 26, 2012). (Year: 2012).*

(Continued)

*Primary Examiner* — Ariana Zimbouski
(74) *Attorney, Agent, or Firm* — Muncy, Geissler, Olds & Lowe, P.C.

(57) ABSTRACT

Provided is a cell preserving vessel which is protected against damage during storage. The cell preserving vessel 1 includes: a vessel body 10 which is made of a flexible resin member and has a cell accommodating part 11; a cell introducing tube 20 which is connected to the vessel body 10 and through which cells are introduced into the cell accommodating part 11; and a pair of tube protecting parts 40 which are arranged to hold the cell introducing tube 20 therebetween and which protect a vicinity of a joined portion of the cell introducing tube 20, the joined portion being (Continued)

joined to the vessel body 10. The tube protecting parts 40 are preferably constituted by sheet members 50 and 60 that form the vessel body 10.

13 Claims, 13 Drawing Sheets

(51) Int. Cl.
  *B29C 65/00* (2006.01)
  *B29L 31/00* (2006.01)

(56) References Cited

U.S. PATENT DOCUMENTS

| | | | | |
|---|---|---|---|---|
| 4,198,972 | A * | 4/1980 | Herb | B65D 75/5855 |
| | | | | 604/408 |
| 4,294,574 | A * | 10/1981 | Bayham | B29C 66/1122 |
| | | | | 493/929 |
| 4,365,629 | A | 12/1982 | Pert | |
| 6,022,344 | A * | 2/2000 | Meijer | B29C 66/5224 |
| | | | | 604/533 |
| 6,808,675 | B1 * | 10/2004 | Coelho | A61J 1/10 |
| | | | | 264/545 |
| 8,287,680 | B2 * | 10/2012 | Foucaut | B29C 66/496 |
| | | | | 156/217 |
| 2004/0254560 | A1 * | 12/2004 | Coelho | B29C 66/4312 |
| | | | | 604/408 |
| 2004/0267228 | A1 | 12/2004 | Hattori et al. | |
| 2006/0024818 | A1 * | 2/2006 | Conconi | A61J 1/00 |
| | | | | 435/307.1 |
| 2014/0147916 | A1 * | 5/2014 | Hirai | A01N 1/0252 |
| | | | | 435/307.1 |
| 2015/0087052 | A1 | 3/2015 | Cullis | |

FOREIGN PATENT DOCUMENTS

| | | |
|---|---|---|
| JP | S62-027636 | 8/1985 |
| JP | 2003205016 A | 7/2003 |
| JP | 2008195443 A | 8/2008 |
| JP | 2009034546 A | 2/2009 |
| JP | 2009136597 A | 6/2009 |
| JP | 2015042212 A | 3/2015 |
| JP | 2017036076 A | 2/2017 |
| WO | WO-2016025847 A1 | 2/2016 |

OTHER PUBLICATIONS

European Communication and Search Report corresponding to EP Application No. 18823479.3 dated Feb. 24, 2021. (pp. 9).
Saint-Gobain: "KryoSure(R) and KryoVue(R)Cryopreservation Products", Jan. 1, 2014 (Jan. 1, 2014), XP055776082, Retrieved from the Internet:RL:https://athica.com.br/wpcontent/uploads/2016/05/FLS-5171A.KryoSureKryoVueBrochure.pdf [retrieved on Feb. 15, 2021] * the whole document*.

* cited by examiner

CELL PRESERVING VESSEL

TECHNICAL FIELD

The present invention relates to a cell preserving vessel for preserving cell suspensions of tissue-derived cells including mesenchymal cells, blood cells including hematopoietic stem cells, cells obtained by culturing the foregoing cells, cells with genetic modification, body fluids including plasma and/or extracts thereof, which are collected from any biological sample.

BACKGROUND ART

In conventional transplantation of hematopoietic stem cells (peripheral blood stem cells, umbilical cord blood, and bone marrow cells), the cells are once frozen and thawed as necessary before transplantation. Tissue-derived cells harvested and processed from biological tissue samples, representative examples of which are mesenchymal cells, cells obtained by culturing the foregoing cells, cells with genetic modifications are used in various applications such as regenerative medicine, immune cell therapy, and gene/cell therapy. These cells are suspended in a cryoprotectant, accommodated in a cell preserving vessel to be cryopreserved for a long period until they are thawed for use (see, e.g., Patent Document 1). Body fluids including plasma and extracts thereof are also cryopreserved for a long period. (Hereinafter, these cells, cell suspensions, body fluids, and the like are collectively referred to as cells).

The cell preserving vessel proposed in Patent Document 1 is made of a flexible resin member, and includes a vessel body having a cell accommodating part capable of accommodating cells, a cell introducing tube which is connected to the vessel body and through which the cells are introduced into the cell accommodating part, and a cell outlet part through which the cells are drawn out from the cell accommodating part.

Patent Document 1: Japanese Unexamined Patent Application, Publication No. 2015-42212

To accommodate and preserve cells in the cell preserving vessel as described above, the cells are first introduced through the cell introducing tube into the cell accommodating part. Next, a portion, of the cell introducing tube, close to the vessel body is fused and cut off (subjected to fusion cutting) to be sealed hermetically. The cell preserving vessel containing the cells is then cryopreserved.

DISCLOSURE OF THE INVENTION

Problems to be Solved by the Invention

When the cell preserving vessel is frozen, the resin members forming the cell preserving vessel harden. Therefore, during cryopreservation of the cell preserving vessel, the fused-and-cut portion of the cell introducing tube may have a risk of damage by contacting with other cell preserving vessels or a container containing the cell preserving vessels.

Therefore, an object of the present invention is to provide a cell preserving vessel having a cell introducing tube that is protected against the damage during cryopreservation.

Means for Solving the Problems

The present invention relates to a cell preserving vessel including: a vessel body which is made of a flexible resin member and has a cell accommodating part; a cell introducing tube which is connected to the vessel body and through which cells are introduced into the cell accommodating part; and a pair of tube protecting parts which are arranged to hold the cell introducing tube therebetween and protect a vicinity of a joined portion of the cell introducing tube, the joined portion being joined to the vessel body.

It is preferable that the vessel body is made of sheet members superposed on each other and joined to each other at peripheral margins thereof, and the tube protecting parts are extended from a peripheral margin of the vessel body.

The tube protecting parts are preferably constituted by the sheet members forming the vessel body.

The tube protecting parts have a recessed groove formed thereon, the recessed groove corresponding to an outline shape of the cell introducing tube.

The recessed groove is preferably larger than the outline shape of the cell introducing tube.

It is preferable that the tube protecting parts further include a retaining part which keeps the tube protecting parts in a state in which the cell introducing tube is held therebetween.

The pair of tube protecting parts described above are preferably different from each other in size.

It is preferable that the pair of tube protecting parts have an identical shape and include a non-overlapping portion.

It is preferable that the vessel body is made of sheet members superposed on each other and joined to each other at peripheral margins thereof, and has a seal part extending outward from the cell accommodating part, and that the cell accommodating part is formed by shaping the sheet members three-dimensionally such that an inner wall of the cell accommodating part has a curvilinear shape in cross section.

It is preferable that the cell accommodating part is formed such that a cross-sectional shape thereof in a plane direction and a cross-sectional shape thereof in a thickness direction are elliptical.

It is preferable that the cell introducing tube is connected to the cell accommodating part at an end portion of a major axis of the cell accommodating part.

It is preferable that the cell preserving vessel further includes a cell outlet part which is arranged on the cell accommodating part at an end portion opposite to the end portion where the cell introducing tube is connected.

The seal part preferably has a rectangular shape in planar view.

Effects of the Invention

The cell preserving vessel of the present invention is protected against damage during storage.

PREFERRED MODE FOR CARRYING OUT THE INVENTION

Preferred embodiments of the cell preserving vessel of the present invention will be described below with reference to the drawings. The cell preserving vessel of the present invention is for use in cryopreservation of cells such as stem cells harvested from a biological sample. As used herein, cells collectively refer to cell suspensions of tissue-derived cells including mesenchymal cells, blood cells including hematopoietic stem cells, cells obtained by culturing the foregoing cells, cells with genetic modification, body fluids including plasma and/or extracts thereof, which are collected from any biological sample.

Figure 1:
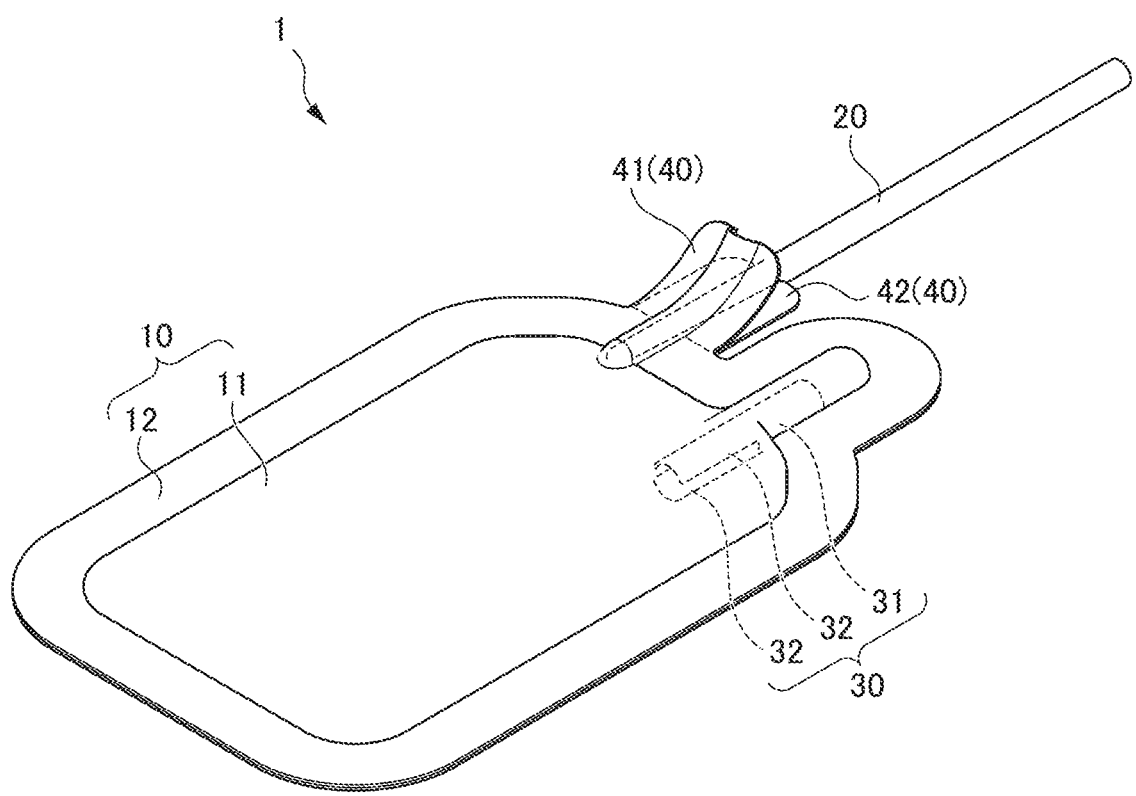
FIG. 1 is a perspective view showing a cell preserving vessel according to a first embodiment of the present invention.
Figure 2:
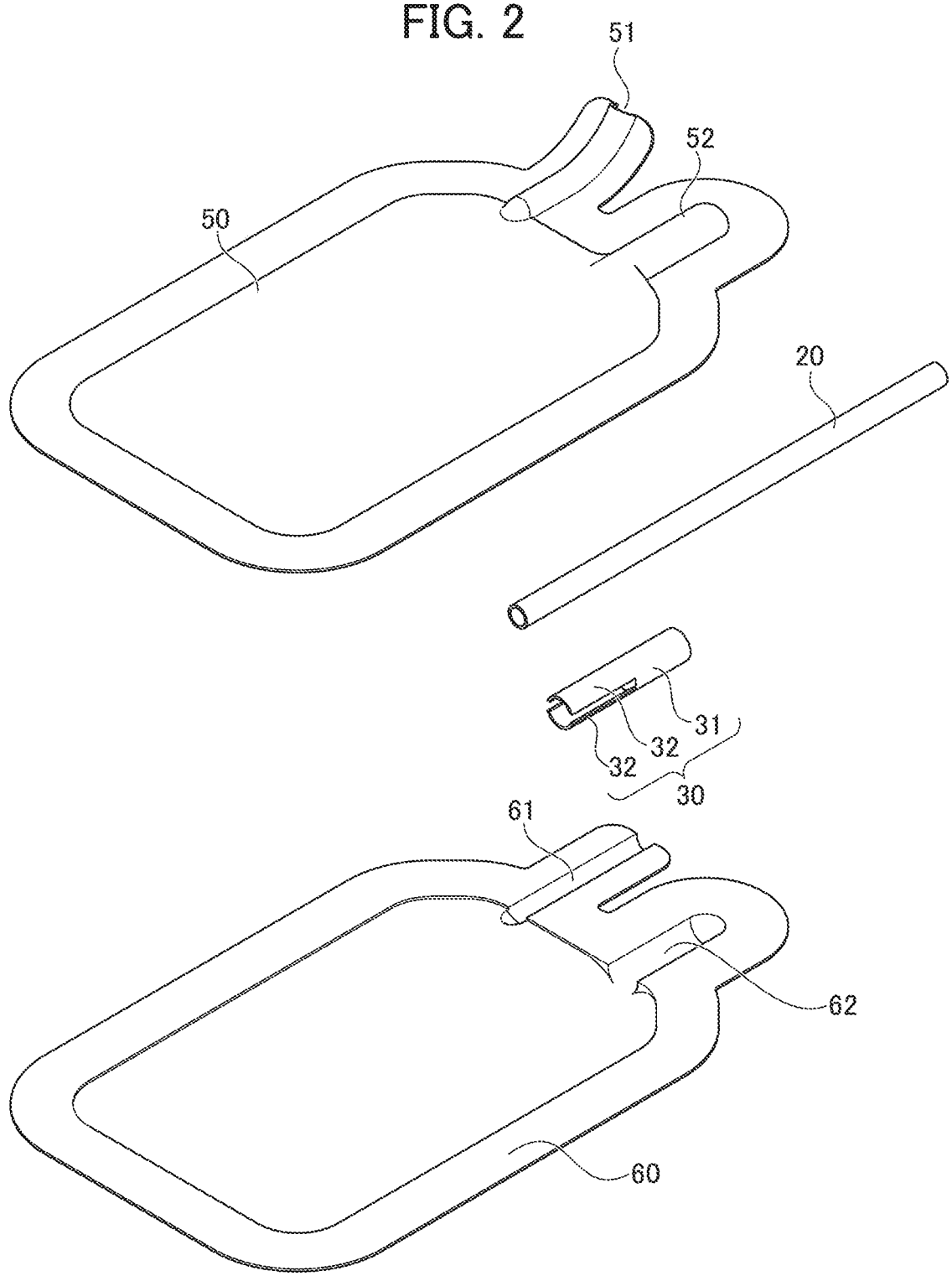
FIG. 2 is an exploded perspective view of the cell preserving vessel according to the first embodiment.
Figure 3:
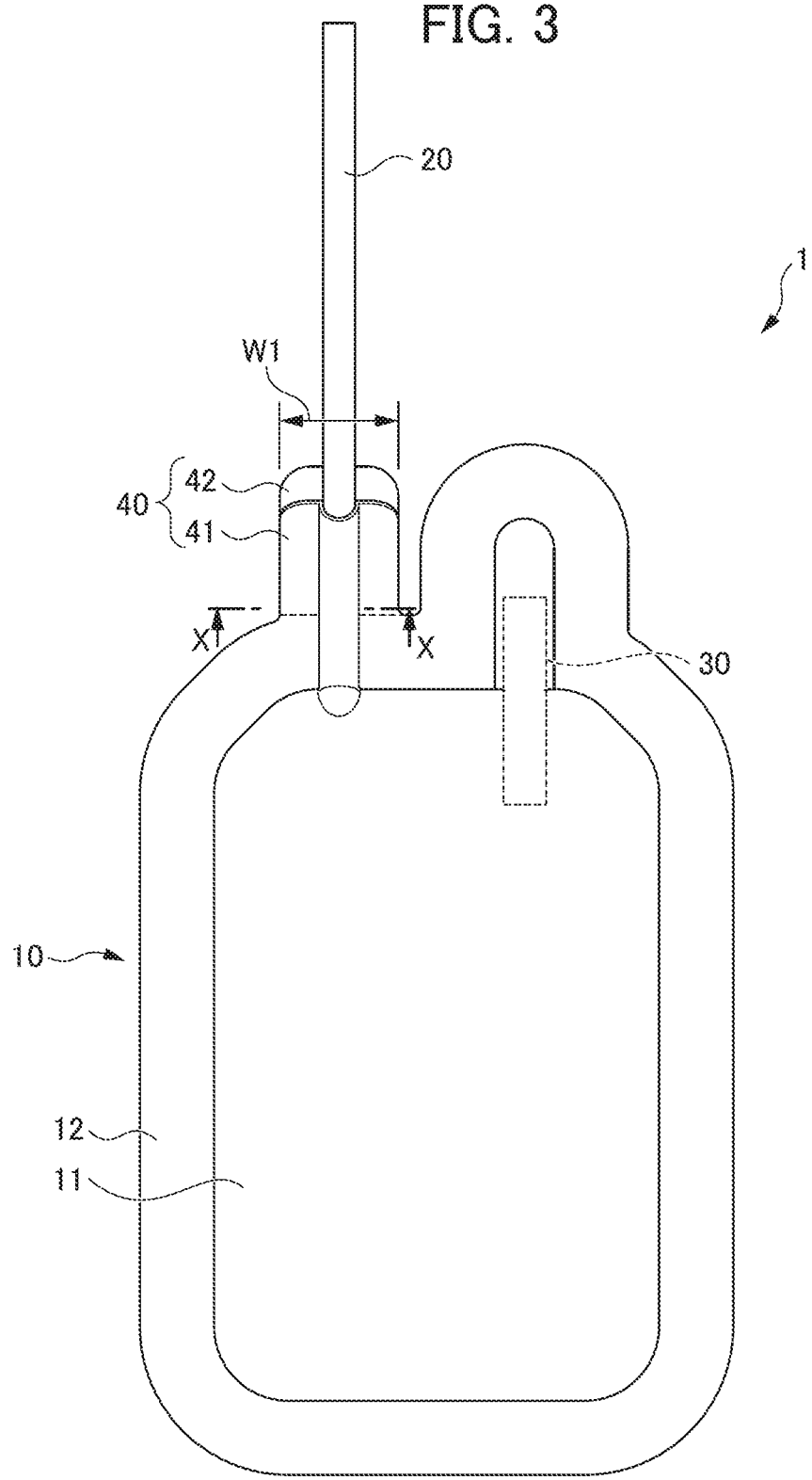
FIG. 3 is a plan view of the cell preserving vessel according to the first embodiment.

First, a cell preserving vessel 1 according to a first embodiment will be described with reference to FIGS. 1 to 4. As shown in FIGS. 1 to 3, the cell preserving vessel 1 according to the first embodiment includes a vessel body 10, a cell introducing tube 20, a port member 30, and tube protecting parts 40.

The vessel body 10 is made of a flexible thermoplastic resin member such as ethylene-vinyl acetate copolymerization resin (EVA resin). The vessel body 10 is configured as a flat bag that is formed by superposing a first sheet member 50 of a thermoplastic resin on a second sheet member 60 of a thermoplastic resin, and by sealed a major portion of a peripheral margin of the first sheet member 50 to a major portion of a peripheral margin of the second sheet member 60. In the first embodiment, the vessel body 10 has a rectangular shape in planar view.

The vessel body 10 includes a cell accommodating part 11 and a seal part 12. The cell accommodating part 11 is a space surrounded by the first sheet member 50 and the second sheet member 60, and is configured to accommodate a predetermined quantity of cells. The cell accommodating part 11 has a capacity ranging preferably from 10 mL to 500 mL, and more preferably from 25 mL to 200 mL.

The seal part 12 is located around a peripheral margin of the cell accommodating part 11, and is constituted by a portion of the first sheet member 50 and a portion of the second sheet member 60, the portions being joined to each other. The seal part 12 extends along the entire periphery of the vessel body 10, as shown in FIGS. 1 to 3. From the viewpoint of ensuring a strength of the cell preserving vessel 1, the seal part 12 has a width ranging preferably from 3 mm to 20 mm, and more preferably from 5 mm to 15 mm.

The cell introducing tube 20 sterilely and airtightly guides cells harvested from a biological sample into the cell accommodating part 11. The cell introducing tube 20 is made of a thermoplastic resin such as EVA resin. One end of the cell introducing tube 20 is connected to a portion of one short side of the vessel body 10, the portion being adjacent to one end of the one short side. More specifically, as shown in FIG. 2, the first sheet member 50 has a recessed groove 51 formed on a portion of a short side of the peripheral margin thereof, the portion being adjacent to one end of the short side. The second sheet member 60 has a recessed groove 61 formed on a portion of a short side of the peripheral margin thereof, the portion being adjacent to one end of the short side. The recessed grooves 51 and 61 are formed by vacuum forming or the like, and each have a semicircular shape in cross section, corresponding to the outline shape of the cell introducing tube 20.

The cell introducing tube 20 is arranged in the recessed grooves 51 and 61 such that one end of the cell introducing tube 20 communicates with the cell accommodating part 11. While the cell introducing tube 20 is kept in this position, the peripheral margin of the first sheet member 50 is joined to that of the second sheet member 60, thereby connecting the cell introducing tube 20 to the vessel body.

The other end of the cell introducing tube 20 is to be sterilely and airtightly connected to, for example, a biological sample container (not shown) containing a biological sample such as blood.

The port member 30 functions as a cell outlet part through which the cells accommodated in the cell accommodating part 11 are removed. The port member 30 is made of a thermoplastic resin, such as EVA resin, similarly to the cell introducing tube 20.

As shown in FIG. 2, the port member 30 includes a tubular portion 31 and a pair of guard portions 32 extending longitudinally from one end of the tubular portion 31. The port member 30 is arranged on a portion of the short side, of vessel body 10, on which the cell introducing tube 20 is arranged, the portion being adjacent to the other end of the short side. More specifically, the first sheet member 50 has a recess 52 formed on a portion of the short side of the peripheral margin thereof, the portion being adjacent to the other end of the short side. The second sheet member 60 has a recess 62 formed on a portion of the short side of the peripheral margin thereof, the portion being adjacent to the other end of the short side. The recesses 52 and 62 are formed by vacuum forming or the like, and each have a semicircular shape in cross section, corresponding to the outline shape of the port member 30. As shown in FIG. 1, the port member 30 is arranged in the recesses 52 and 62 such that the pair of guard portions 32 is positioned in the cell accommodating part 11 and faces the first sheet member 50 and the second sheet member 60. The other end of the port member 30 is positioned inside relative to the outer edges of the first and second sheet members 50 and 60, and inside relative to the ends of the recesses 52 and 62. While the port member 30 is kept in this position, the peripheral margin of the first sheet member 50 is joined to that of the second sheet member 60, so that the port member 30 is integrated with the vessel body 10 with one end of the port member 30 communicating with the cell accommodating part 11 and the other end covered with the seal part 12.

The tube protecting parts 40 are each formed in a sheet shape, and are arranged in a pair such that the cell introducing tube 20 is held therebetween. The tube protecting parts 40 protect a vicinity of a joined portion of the cell introducing tube 20, the joined portion being joined to the vessel body 10. Here, the vicinity of the joined portion of the cell introducing tube 20 to the vessel body 10 refers to an area of up to about 50 mm from the joined portion (the outer edge of the seal part 12), and in which area the cell introducing tube 20 is fused and cut off after the cells are introduced in the cell accommodating part 11. In the first embodiment, the tube protecting parts 40 are constituted by a portion of the first sheet member 50 and a portion of the second sheet member 60. Specifically, the tube protecting parts 40 are constituted by an extended portion of the first sheet member 50 and an extended portion of the second sheet member 60, the extended portions corresponding to the position in which the cell introducing tube 20 is arranged, being extended from a portion (the outer edge of the seal part 12) forming part of the vessel body 10 in a direction in which the cell introducing tube 20 extends, and not being joined to each other. Here, the extended portions of the first and second sheet members 50 and 60 are not joined to the cell introducing tube 20, either. In this way, the pair of tube protecting parts 40 is formed such that only the proximal ends of the tube protecting parts 40 are continuous with the outer edge of the seal part 12 and the distal end portions extend to hold the cell introducing tube 20 therebetween.

Figure 4:
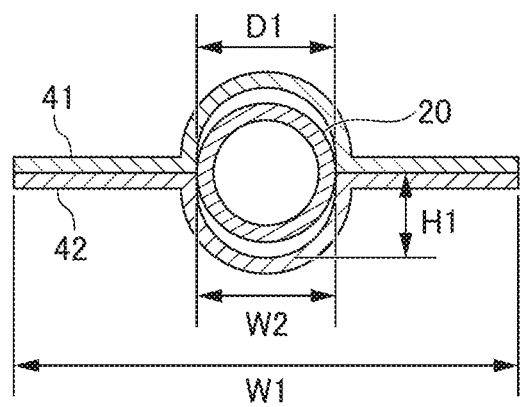
FIG. 4 is a cross-sectional view taken along line X-X in FIG. 3.

In the first embodiment, the pair of tube protecting parts 40 are made by different size from each other. Specifically, as shown in FIG. 3, the pair of tube protecting parts 40 consists of a first tube protecting part 41 and a second tube protecting part 42. The first tube protecting part 41 is shorter than the second tube protecting part 42 in an extension direction in which the tube protecting parts 40 extend. As shown in FIG. 4, the tube protecting parts 40 are formed to have a width W1 larger than the outer diameter D1 of the cell introducing tube 20. From the viewpoint of suitably protecting the cell introducing tube 20, the width W1 of the tube protecting parts 40 is preferably 2 to 10 times, and more preferably 3 to 7 times as large as the outer diameter D1 of the cell introducing tube 20.

As shown in FIG. 2, the tube protecting parts 40 have recessed grooves 51 and 61 formed thereon and corresponding to the outline shape of the cell introducing tube 20. In the first embodiment, these recessed grooves 51 and 61 are formed to be continuous and integral with the recessed grooves 51 and 61 formed in the seal part 12. In the first embodiment, the recessed grooves 51 and 61 have a width W2 approximately equal to the outer diameter D1 of the cell introducing tube 20, and have a depth H1 approximately equal to one-half of the outer diameter D1 of the cell introducing tube 20.

Figure 5A:
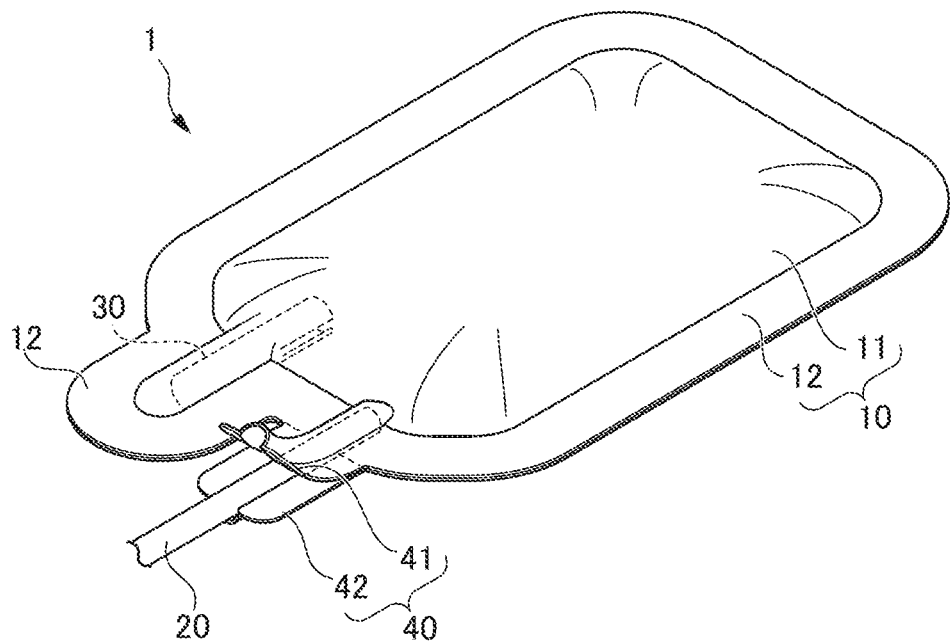
FIG. 5A is a diagram showing the cell preserving vessel of the first embodiment in a use state before a cell introducing tube is fused and cut off.
Figure 5B:
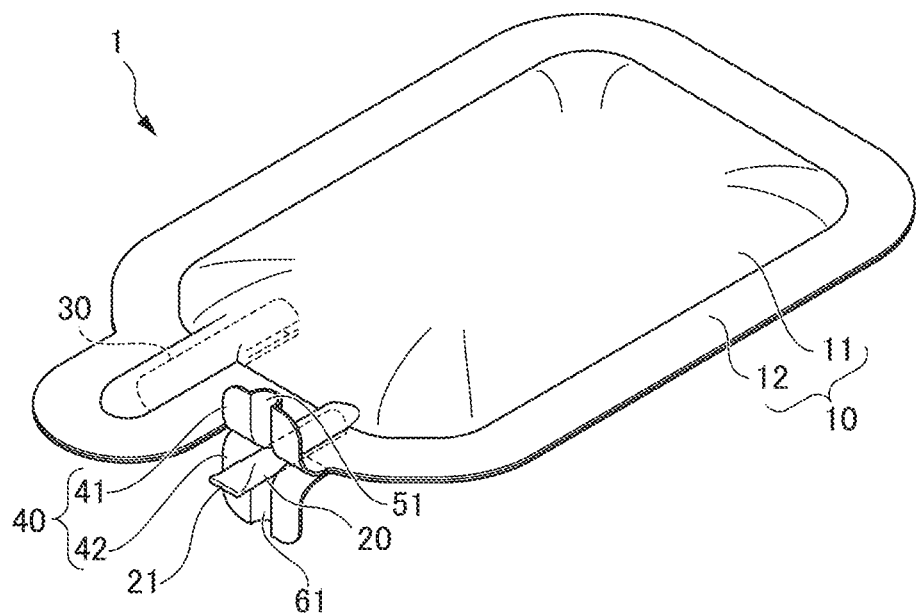
FIG. 5B is a diagram showing the cell preserving vessel of the first embodiment in a use state after a pair of tube protecting parts have been peeled off and the cell introducing tube has been fused and cut off.
Figure 5C:
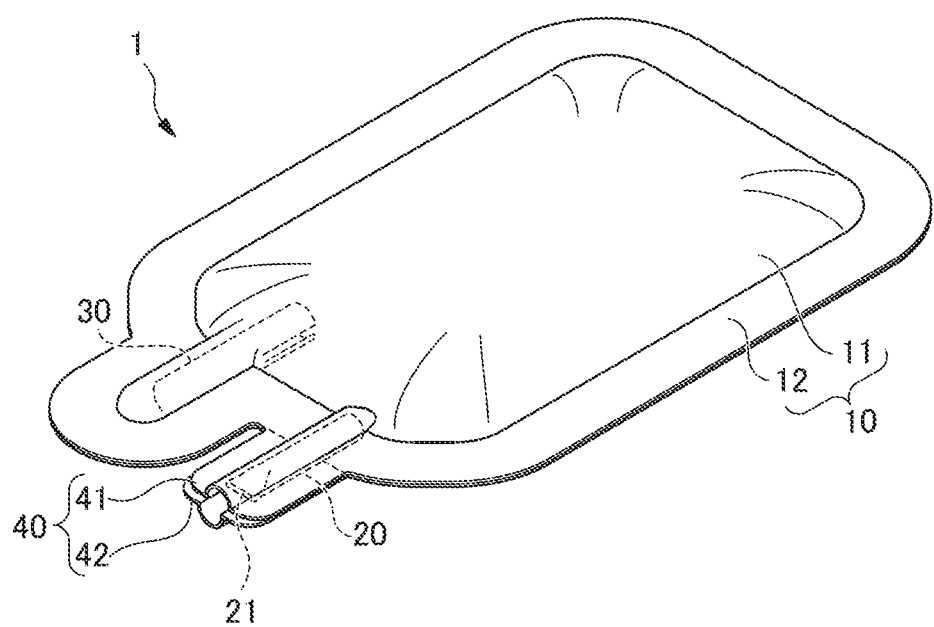
FIG. 5C is a diagram showing the cell preserving vessel of the first embodiment in a use state in which a fused-and-cut portion of the cell introducing tube subjected to the fusion cutting is protected by the pair of tube protecting parts.

Next, it will be described how to use the cell preserving vessel 1 of the first embodiment, with reference to FIGS. 5A to 5C. When in use, the cell preserving vessel 1 is sterilely and airtightly connected to a biological sample container such as a blood bag via the cell introducing tube 20. In a case where the cell preserving vessel 1 is used to accommodate cells, predetermined cells (e.g., serum or umbilical cord blood) that have been separated in the biological sample container are introduced into the cell accommodating part 11 via the cell introducing tube 20. Next, after the cells are introduced in the cell accommodating part 11, the cell introducing tube 20 is fused and cut off in the vicinity of the joined portion to the vessel body 10, as shown in FIGS. 5A and 5B. As a result, the cell preserving vessel 1 is sealed hermetically. At this time, as shown in FIG. 5B, the tube protecting parts 40 are peeled off each other, and the cell introducing tube 20 is fused and cut off at a point to be held between the pair of tube protecting parts 40. As a result, a fused-and-cut portion 21 of the cell introducing tube 20 is held between the pair of tube protecting parts 40 and thereby protected without being exposed to the outline, as shown in FIG. 5C. The cell preserving vessel 1 is cryopreserved while being in this state.

To use the cells accommodated in the cryopreserved cell preserving vessel 1, the cells accommodated in the cell accommodating part 11 are first thawed. Next, the part (seal part 12) covering the port member 30 of the vessel body 10 is cut with scissors or the like, so that the distal end (the other end) of the port member 30 is exposed. The thawed cells are then collected through the port member 30 using a syringe (not shown) having a needle attached to the tip thereof.

The above-described cell preserving vessel 1 according to the first embodiment achieves the following effects.

(1) When the cell preserving vessel 1 is in cryopreservation, the thermoplastic resins forming the cell preserving vessel 1 harden. For this reason, during storage of the cell preserving vessel 1, the fused-and-cut portion 21 of the cell introducing tube 20 may be damaged by contacting with another cell preserving vessel or a container containing the cell preserving vessels. Such damage to the fused-and-cut portion 21 may lead to unsealing of the cell preserving vessel 1, incurring the risk of leakage of the contents, or the risk of contamination of the accommodated cells. To address this problem, the cell preserving vessel 1 is formed to include the pair of tube protecting parts 40 arranged to hold the cell introducing tube 20 therebetween. Thus, in a case where the cell introducing tube 20 is fused and cut off subsequent to the introduction of cells into the cell accommodating part 11, the fused-and-cut portion 21 of the cell introducing tube 20 can be protected by the tube protecting parts 40 holding the fused-and-cut portion 21 therebetween. As a result, the fused-and-cut portion 21 of the cell introducing tube 20 is less likely to come into contact with another cell preserving vessel or a container containing the cell preserving vessels, so that the fused-and-cut portion 21 of the cell introducing tube 20 can be made resistant to damage even when the resin members forming the cell preserving vessel 1 harden when the cell preserving vessel 1 is frozen.

(2) The vessel body 10 is made of the first sheet member 50 and the second sheet member 60 superposed on each other and joined to each other at the peripheral margins thereof, and has the tube protecting parts 40 extending from the peripheral margin of the vessel body 10. This feature makes it possible to sufficiently protect the vicinity of the joined portion of the cell introducing tube 20 to the vessel body 10 (the vicinity referring to, for example, an area of up to about 50 mm from the outer edge of the vessel body 10 (seal part 12), the area turning into the fused-and-cut portion 21 subsequent to the introduction of the cells into the cell accommodating part 11). Thus, the cell introducing tube 20 can be fused and cut off so that a further shorter portion thereof remains, and the fused-and-cut portion 21 can be protected sufficiently. As a result, a reduced amount of air is allowed to remain in the cell introducing tube 20, thereby contributing to reduction in deterioration, of the quality of the cells, which can be caused by contact of the cells with air. In addition, if the remaining portion of the cell introducing tube 20 is long, the quantity of available cells may decrease because, for example, part of the cells accommodated in the cell accommodating part 11 adhere to the remaining portion of the cell introducing tube 20. In contrast, shortening the remaining portion enables more effective use of the cells accommodated in the cell accommodating part 11. Furthermore, forming the tube protecting parts 40 by the portions extended from the peripheral margin of the vessel body 10 contributes to enhancement of the strength of the vicinity of the joined portion of the cell introducing tube 20 to the vessel body 10, thereby protecting the cell introducing tube 20 from bending at the joined portion to the vessel body 10.

(3) The tube protecting parts 40 are constituted by the sheet members (first sheet member 50 and second sheet member 60) forming the vessel body 10. Thus, the vessel body 10 and the tube protecting parts 40 are formed integrally with each other, thereby contributing to improving manufacturing efficiency of the cell preserving vessel 1.

(4) The tube protecting parts 40 have the recessed grooves 51 and 61 formed thereon and corresponding to the outline shape of the cell introducing tube 20. This feature enables the tube protecting parts 40 to hold the cell introducing tube 20 therebetween further suitably, thereby contributing to enhancement of the protective performance of the tube protecting parts 40 with respect to the cell introducing tube 20 (the fused-and-cut portion 21) and to improvement of the damage resistance of the cell introducing tube 20 (and the fused-and-cut portion 21).

(5) The pair of tube protecting parts 40 are formed to differ from each other in size (in length in the extension direction) (see FIGS. 3 and 5C). With this feature, the tube protecting parts 40 holding the cell introducing tube 20 therebetween can be easily peeled off each other and opened when the cell introducing tube 20 is fused and cut off subsequent to the introduction of the cells into the cell accommodating part 11 (see FIGS. 5A and 5B). As a result, the operability of the cell preserving vessel 1 including the pair of tube protecting parts 40 can be improved.

Next, a cell preserving vessel 1A of a second embodiment will be described with reference to FIGS. 6 to 9. The cell preserving vessel 1A of the second embodiment differs from the cell preserving vessel of the first embodiment mainly in that a cell accommodating part 11A and recessed grooves 51A and 61A of the second embodiment have different shapes from those of the corresponding components of first embodiment. Note that in the description of the second and subsequent embodiments, the same elements as those of the foregoing embodiment are denoted by the same reference characters, and the description thereof is omitted or simplified.

Figure 8:
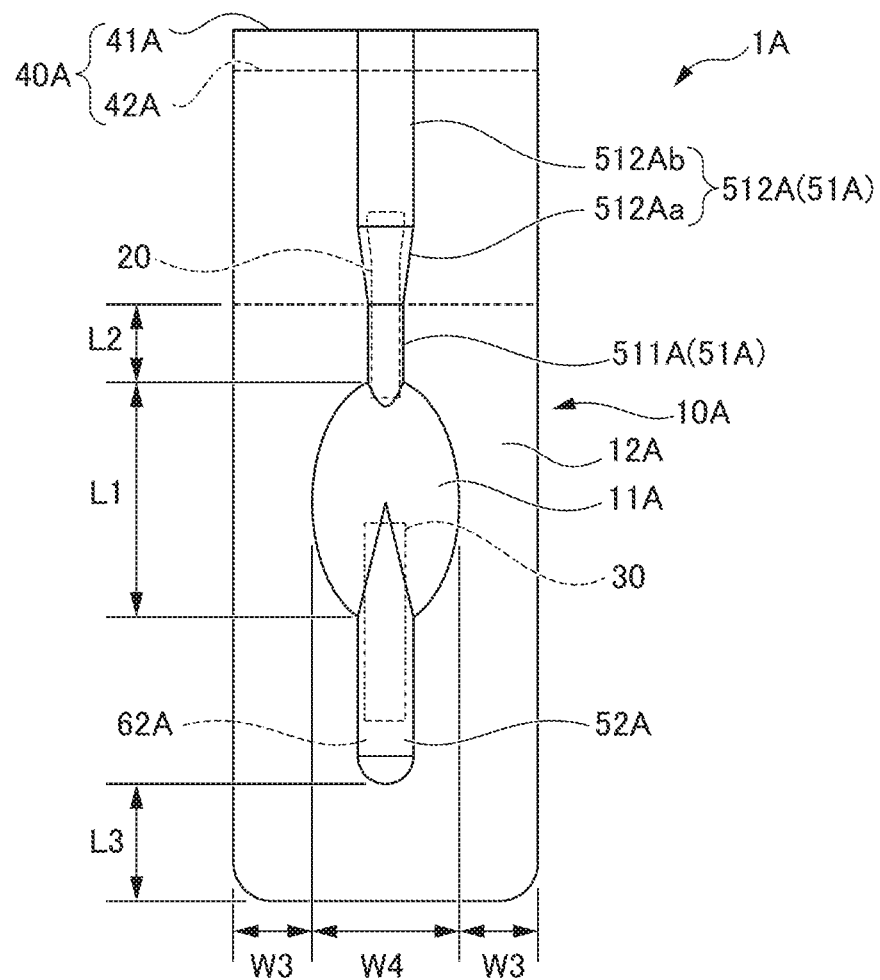
FIG. 8 is a plan view showing the cell preserving vessel according to the second embodiment.
Figure 9:
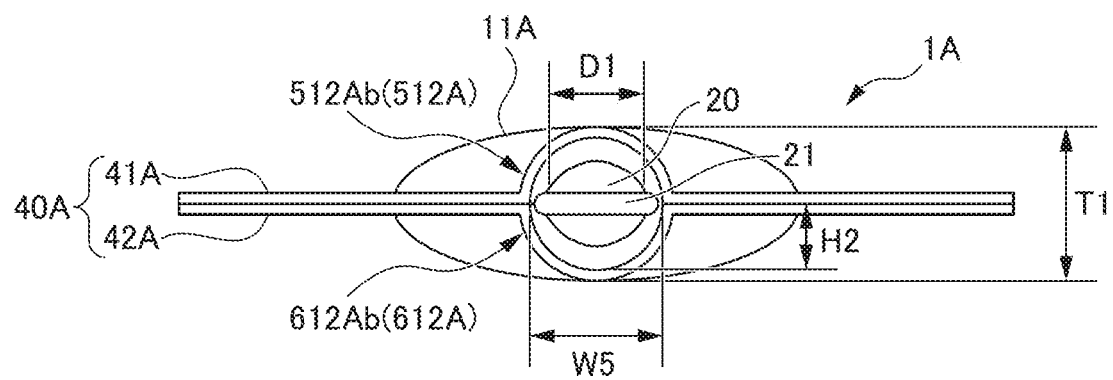
FIG. 9 is a diagram showing the cell preserving vessel, viewed along the arrow A of FIG. 7.

The cell preserving vessel 1A of the second embodiment is particularly suitable for storing a small quantity of cells, in the range approximately from 1 mL to 10 mL. In the second embodiment, the cell accommodating part 11A is shaped three-dimensionally such that the inner wall of the cell accommodating part 11A has a curvilinear shape in cross section. More specifically, as shown in FIGS. 8 and 9, the cell accommodating part 11A is formed such that a cross-sectional shape thereof in a thickness direction and a cross-sectional shape thereof in a plane direction are both elliptical. In other words, the inner surface of the cell accommodating part 11A is configured as a concave surface having no corners. In the second embodiment, as shown in FIGS. 8 and 9, the cell accommodating part 11A is formed to have a length (width) W4 of 20 mm in the minor axis direction, a length L1 of 30 mm in the major axis direction, and a thickness T1 of 8 mm, and is capable of accommodating 2 mL of cells. The ellipsoidal shape (three-dimensional shape) of the cell accommodating part 11A is achieved by, for example, vacuum forming a first sheet member 50 and a second sheet member 60 using a mold having a shape corresponding to the shape of cell accommodating part 11A.

In the second embodiment, a cell introducing tube 20 is connected to the ellipsoidal cell accommodating part 11A at one end portion of the major axis. A port member 30 is arranged on the ellipsoidal cell accommodating part 11A at the other end portion of the major axis (i.e., the end portion where the cell introducing tube 20 is not connected).

In the second embodiment, while the cell accommodating part 11A has an elliptical shape in planar view, a seal part 12A has a rectangular outline shape (rectangular outer edge). From the viewpoint of ensuring strength, the seal part 12A has, in the width direction, a length W3 ranging preferably from 3 mm to 20 mm, and more preferably from 5 mm to 15 mm. In addition, from the viewpoint of ensuring the strength of the cell preserving vessel 1A (the cell accommodating part 11A), a longitudinal length L2 of a portion, of the seal part 12A, that is adjacent to the cell introducing tube 20 (i.e., a length from the end of the cell accommodating part 11A to the outer edge of the seal part 12A) and a length L3 of a portion, of the seal part 12A, that is adjacent to the port member 30 (i.e., a length from the ends of recesses 52A and 62A to the outer edge of a vessel body 10A) are both preferably from 3 mm to 20 mm, and more preferably from 3 mm to 15 mm. Designing the portions of the seal part 12A to have the length within the above-mentioned ranges with respect to the cell accommodating part 11A makes it possible that when the cell preserving vessel 1A receives an external impact during storage, the seal part 12A softens the impact.

Figure 6:
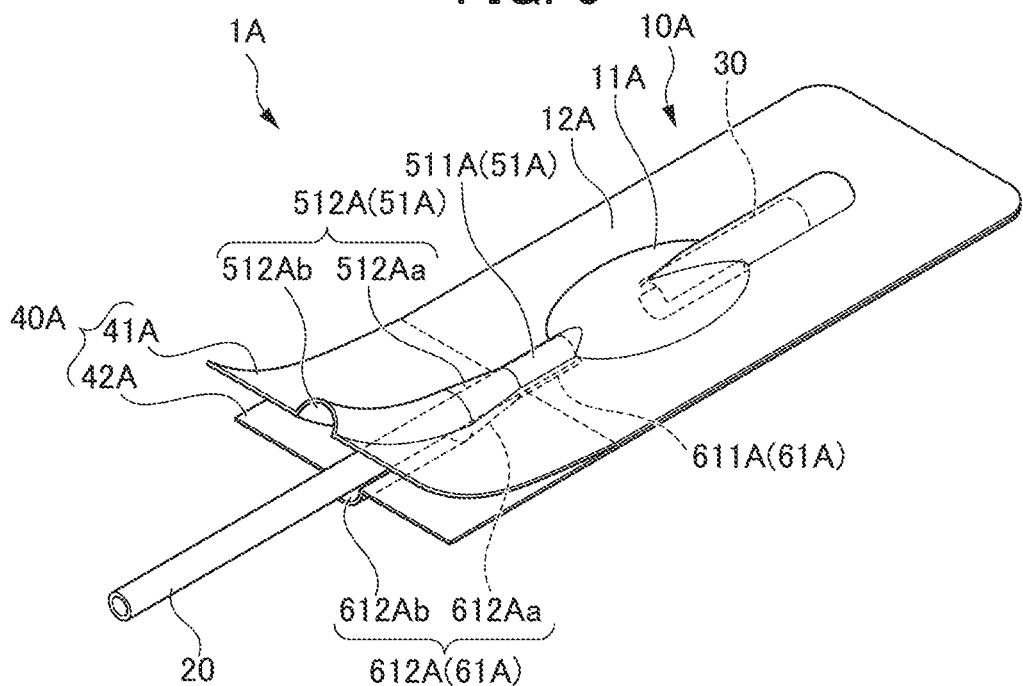
FIG. 6 is a perspective view showing a cell preserving vessel according to a second embodiment of the present invention, with a pair of tube protecting parts being slightly opened.
Figure 7:
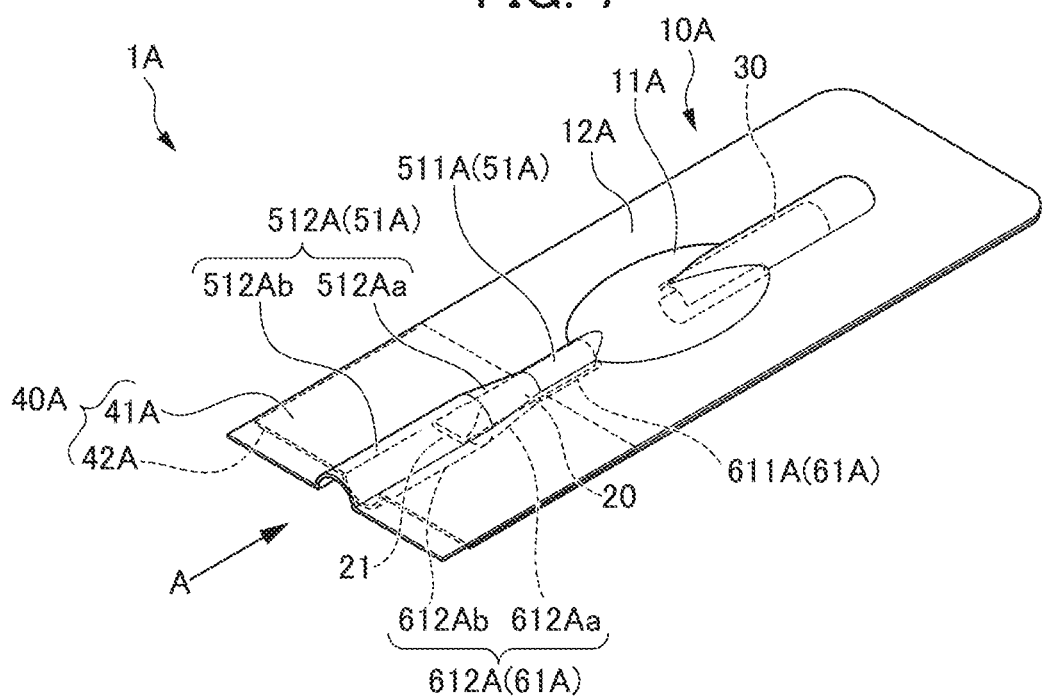
FIG. 7 is a perspective view showing the cell preserving vessel according to the second embodiment, with the pair of tube protecting parts being closed.

In the second embodiment, a pair of tube protecting parts 40A extends from the entire short side, of the vessel body 10A, to which the cell introducing tube 20 is connected, as shown in FIGS. 6 to 8. As shown in FIG. 9, in each of the recessed grooves 51A and 61A, a portion formed in the associated one of the tube protecting parts 40A is larger than the outline shape of the cell introducing tube 20. Specifically, as shown in FIG. 6, the recessed grooves 51A and 61A of the second embodiment respectively include seal part-side recessed grooves 511A and 611A formed at a position corresponding to the seal part 12A, and protecting part-side recessed grooves 512A and 612A formed at a position corresponding to the tube protecting parts 40A.

The seal part-side recessed grooves 511A and 611A are shaped and sized so as to substantially match with the outline shape of the cell introducing tube 20, as in the first embodiment. The protecting part-side recessed grooves 512A and 612A are larger than the outline shape of the cell introducing tube 20, as shown in FIG. 9. Specifically, as shown in FIG. 8, the protecting part-side recessed grooves 512A and 612A respectively have: increasing diameter portions 512Aa and 612Aa having a diameter increasing from the ends adjacent to the seal part-side recessed grooves 511A and 611A as proximal ends toward the distal ends; and large diameter portions 512Ab and 612Ab that are larger than the outline shape of the cell introducing tube 20.

The protecting part-side recessed grooves 512A and 612A have, in the large diameter portion thereof, a width W5 that is preferably two to four times as large as the outer diameter D1 of the cell introducing tube 20. The protecting part-side recessed grooves 512A and 612A have, in the large diameter portion, a depth H2 that is preferably 1.4 to 3.5 times as large as the outer diameter D1 of the cell introducing tube 20. Designing the width W5 of the large diameter potions of the protecting part-side recessed grooves 512A and 612A to be within the range from 2 to 4 times the outer diameter D1 of the cell introducing tube 20 makes it possible that the protecting part-side recessed grooves 512A and 612A suitably accommodate therein the fused-and-cut portion 21 of the cell introducing tube 20 even if the width of the fused-and-cut portion 21 becomes wider than the outer diameter D1 of the cell introducing tube 20. Further, designing the width W5 of the large diameter portions of the protecting part-side recessed grooves 512A and 612A to be within the range from two to four times the outer diameter D1 of the cell introducing tube 20 causes a gap to be formed between the cell introducing tube 20 and the tube protecting parts 40A. The formation of the gap makes it difficult for an external impact to be transmitted to the cell introducing tube 20 (the fused-and-cut portion 21), and can reduce the possibility that other cell accommodating vessels, etc., come into direct contact with the cell introducing tube 20 (the fused-and-cut portion 21).

Next, it will be described how to use the cell preserving vessel 1 of the second embodiment. The cell preserving vessel 1A is sterilely and airtightly connected to a biological sample container such as a blood bag via the cell introducing tube 20, as in the first embodiment.

In a case where the cell preserving vessel 1A is used to accommodate cells, predetermined cells (e.g., serum or umbilical cord blood) that have been separated in the biological sample container are introduced into the cell accommodating part 11A via the cell introducing tube 20. Here, in the second embodiment, the inner wall (inner surface) of the cell accommodating part 11A is configured as a curved surface having no corners. This feature causes air to be smoothly expelled from the cell accommodating part 11A when the cells are introduced to take place of the air, making it unlikely that air bubbles remain in the cell accommodating part 11A. Thus, cells in a quantity that is preset for the cell accommodating part 11A can be suitably introduced.

Next, once the cells are introduced in the cell accommodating part 11A, the cell introducing tube 20 is fused and cut off, as in the first embodiment. As a result, the cell preserving vessel 1A is sealed hermetically. The cell preserving vessel 1A thus sealed is cryopreserved.

To use the cells accommodated in the cryopreserved cell preserving vessel 1A, the cells accommodated in the cell accommodating part 11A are first thawed. Next, the part (seal part 12A) covering the port member 30 of the vessel body 10A is cut with scissors or the like, so that the distal end (the other end) of the port member 30 is exposed. The thawed cells are then collected through the port member 30 using a syringe (not shown) having a needle attached to the tip thereof.

The above-described cell preserving vessel 1A according to the second embodiment achieves the following effects, in addition to the effects (1) to (5) described above.

(6) The recessed grooves 51A and 61A (protecting part-side recessed grooves 512A and 612A) are larger than the outline shape of the cell introducing tube 20. This feature makes it possible that the protecting part-side recessed grooves 512A and 612A suitably accommodate therein the fused-and-cut portion 21 of the cell introducing tube 20 even if the width of the fused-and-cut portion 21 becomes wider than the outer diameter D1 of the cell introducing tube 20. In addition, the formation of the gap between the cell introducing tube 20 and the tube protecting parts 40A can make it further difficult for an external impact to be transmitted to the cell introducing tube 20 (the fused- and cut portion 21). (7) The cell accommodating part 11A is formed by three-dimensionally shaping the sheet members (the first sheet member 50 and the second sheet member 60) such that the inner wall of the cell accommodating part 11A has a curvilinear shape in cross section. This feature allows air bubbles in the cell accommodating part 11A to move smoothly toward the cell introducing tube 20, making it difficult for the air bubbles to remain in the cell accommodating part 11A when cells are introduced through the cell introducing tube 20. In particular, in a case where a small quantity of cells is preserved, air bubbles remaining in the cell accommodating part 11A significantly affect the capacity for storing the cells by making the capacity insufficient. For this reason, the cell preserving vessel 1 of this embodiment can be suitably applied as a cell preserving vessel for storing a small quantity of cells ranging approximately from 1 mL to 10 mL.

(8) The cell accommodating part 11A is formed so as to have an elliptical cross-sectional shape in the plane direction and an elliptical cross-sectional shape in the thickness direction. This feature allows air bubbles in the cell accommodating part 11A to move further smoothly toward the cell introducing tube 20, making it further unlikely that the air bubbles remain in the cell accommodating part 11A when cells are introduced through the cell introducing tube 20.

(9) The cell introducing tube 20 is connected to the cell accommodating part 11A at one end portion of the major axis thereof. Thus, the cell introducing tube 20 is arranged at one longitudinal end portion of the ellipsoidal cell accommodating part 11A. This feature can make it more unlikely that air bubbles remain in the cell accommodating part 11A.

(10) The cell preserving vessel 1 includes the port member 30 that functions as a cell outlet part, and the port member 30 is arranged on the cell accommodating part 11A at the end portion (the other end portion of the major axis) opposite to the end portion where the cell introducing tube 20 is arranged. As a result, in the cell preserving vessel 1A having the ellipsoidal cell accommodating part 11A, the cell outlet part can be positioned so as not to interfere with the introduction of the cells, so that the cells can be introduced and removed smoothly, and removal of the accommodated cells can be performed substantially without allowing the cells to remain.

(11) The seal part 12A is formed to have a rectangular shape in planar view. Thus, even though the cell accommodating part 11A is formed to have a curvilinear shape, the vessel body 10A has a rectangular shape in planar view. This feature contributes to improving storage efficiency in a case where the cell preserving vessel 1A is stored in a container such as a canister. In addition, the seal part 12A softens an impact occurring when the cell preserving vessel 1A comes into contact with a canister or the like during storage. Furthermore, for example, if the cell accommodating part 11A is designed to have a small capacity (e.g., of 2 ml), it is difficult to attach a label, etc. to the curvilinearly-shaped cell accommodating part 11A. However, the label, etc. can be easily attached to the seal part 12A formed to have a rectangular shape. Thus, the content of the cell preserving vessel 1A can be appropriately indicated.

Figure 10:
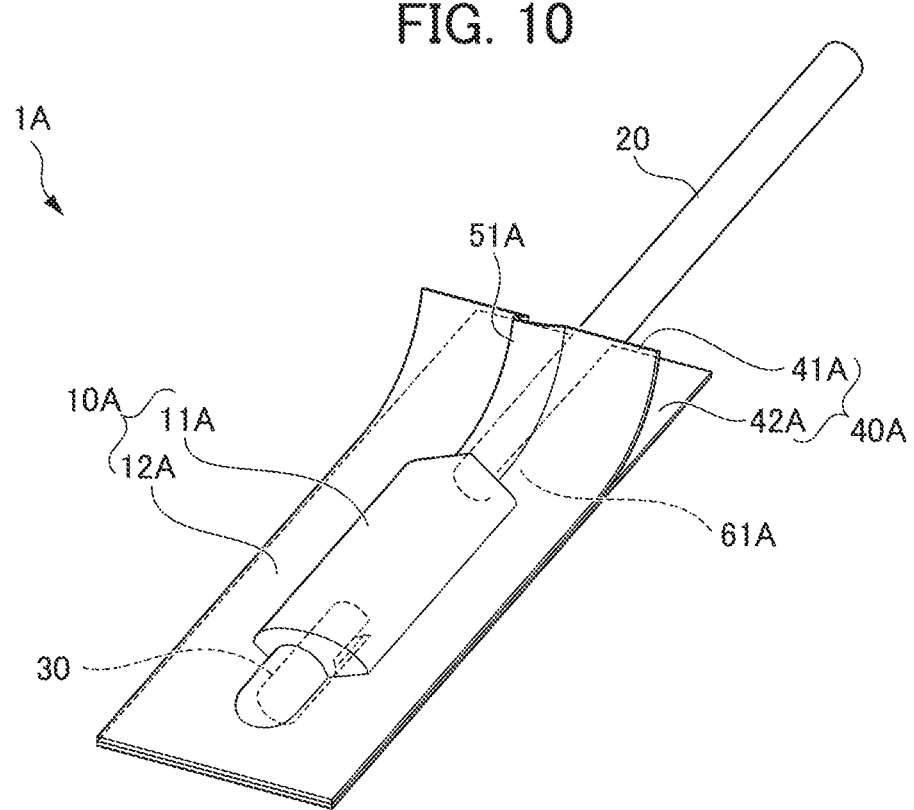
FIG. 10 is a perspective view showing a cell preserving vessel according to a third embodiment of the present invention.

Next, a cell preserving vessel 1A according to a third embodiment will be described with reference to FIG. 10. The cell preserving vessel 1A of the third embodiment has the same configuration as in the second embodiment, except the configuration of a cell accommodating part 11A. In the third embodiment, the cell accommodating part 11A is formed three-dimensionally to have a substantially cylindrical shape. In the third embodiment, the three-dimensional shape of the cell accommodating part 11A is also achieved by, for example, vacuum shaping a first sheet member 50 and a second sheet member 60 using a mold having a shape corresponding to the shape of the cell accommodating part 11A. The cell preserving vessel 1A of the third embodiment achieves the effects (1) to (6) and (9) to (11) described above.

Figure 11:
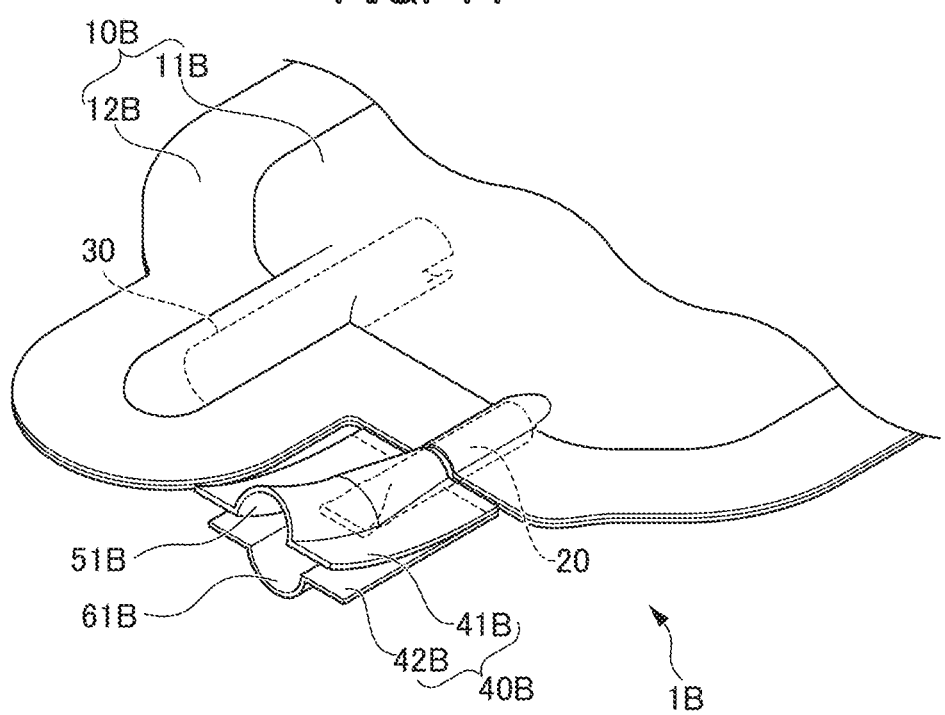
FIG. 11 is a perspective view showing a cell preserving vessel according to a fourth embodiment of the present invention.

Next, a cell preserving vessel 1B according to a fourth embodiment will be described with reference to FIG. 11. The cell preserving vessel 1B of the fourth embodiment differs from the cell preserving vessel of the first embodiment mainly in a configuration of a pair of tube protecting parts 40B.

In the fourth embodiment, the pair of tube protecting parts 40B is constituted by sheet members that are separate from the sheet members forming a vessel body 10B. The pair of tube protecting parts 40B is joined to a cell introducing tube 20 in the vicinity of a joined portion between the cell introducing tube 20 and the vessel body 10 such that the cell introducing tube 20 is held between the pair of tube protecting parts 40B. The cell preserving vessel 1B of the fourth embodiment achieves the following effect, in addition to the effects (1) and (4) to (6) described above.

(12) The tube protecting parts 40B are constituted by the sheet members that are separate from the sheet members forming the vessel body 10B. This feature can increase flexibility in selection of materials for the tube protecting parts 40B. Thus, the tube protecting parts can be made of a material that is superior in impact absorbability.

Figure 12:
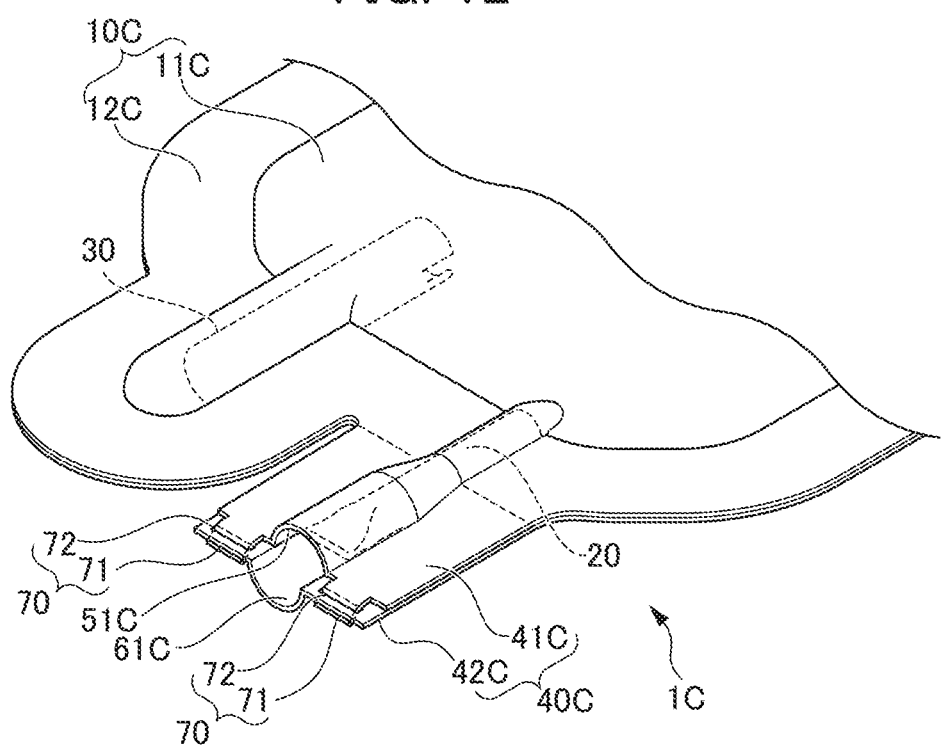
FIG. 12 is a perspective view showing a cell preserving vessel according to a fifth embodiment of the present invention.

Next, a cell preserving vessel 1C according to a fifth embodiment will be described with reference to FIG. 12. The cell preserving vessel 1C of the fifth embodiment differs from the cell preserving vessel of the first embodiment in that the cell preserving vessel 1C further includes a retaining part 70. The retaining part 70 is configured to keep a pair of tube protecting parts 40C in a state in which the cell introducing tube 20 is held therebetween. In the fifth embodiment, the retaining part 70 is composed of a pair of retaining strips 71 and a pair of retaining slits 72. The pair of retaining strips 71 is provided in an distal end portion of a first tube protecting part 41C and extends in a direction in which the cell introducing tube 20 extends, whereas the pair of retaining slits 72 is cut in a second tube protecting part 42C and allows the pair of retaining strips 71 to be inserted thereinto, the first tube protecting part 41C being shorter in an extension direction than the second tube protecting part 42C. With the retaining part 70 thus configured, after the cell introducing tube 20 is fused and cut off or before the cell preserving vessel 1C is used, the pair of retaining strips 71 is inserted into the pair of retaining slits 72, so that the pair of tube protecting parts 40C can be suitably kept in a state in which the cell introducing tube 20 is held therebetween, without separating from each other again.

The cell preserving vessel 1C of the fifth embodiment described above achieves the following effect, in addition to the effects (1) to (6) described above.

(13) The cell preserving vessel 1C includes the retaining part 70 configured to keep the tube protecting parts 40C in a state in which the cell introducing tube 20 is held therebetween. After the cell introducing tube 20 has been fused and cut off, this feature allows the pair of tube protecting parts 40 to be kept in a state in which the cell introducing tube 20 is held therebetween, without separating from each other again. As a result, the protective performance of the tube protecting parts 40 for protecting the cell introducing tube 20 (the fused-and-cut portion 21) can be further improved.

Figure 13:
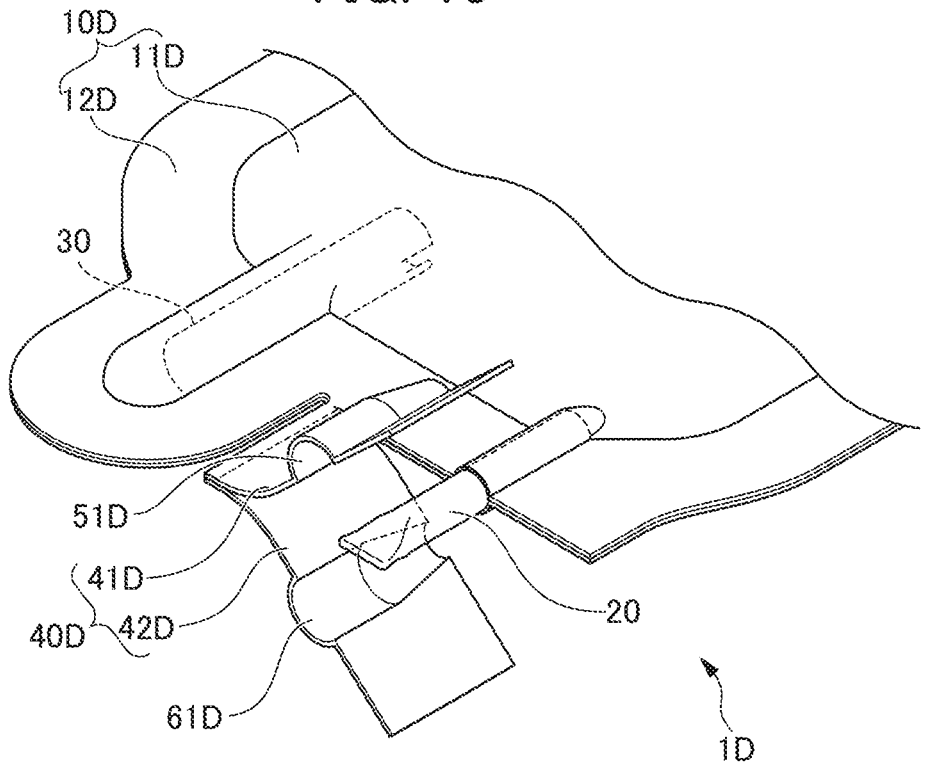
FIG. 13 is a perspective view showing a cell preserving vessel according to a sixth embodiment of the present invention.

Next, a cell preserving vessel 1D according to a sixth embodiment will be described with reference to FIG. 13. The cell preserving vessel 1D of the sixth embodiment differs from the cell preserving vessel of the first embodiment in the direction in which a pair of tube protecting parts 40D opens. In the sixth embodiment, the pair of tube protecting parts 40D are joined to each other at one side extending in a direction in which a cell introducing tube 20 extends, while the remaining portions of the tube protecting parts 40D are not joined. The pair of tube protecting parts 40D and a vessel body 10D are continuous with each other at the portion where the tube protecting parts 40D are joined to each other, but are separated from each other at the remaining portions. Thus, as shown in FIG. 13, the pair of tube protecting parts 40 can be opened and peeled off each other in a width direction (in a lateral direction), so that the cell introducing tube 20 can be exposed up to the joined portion between the cell introducing tube 20 and the vessel body 10D. This feature makes it easy to position a fusion cutter at a point to be fused and cut off, thereby facilitating the fusion cutting processing. Thus, the cell introducing tube 20 can be fused and cut off at a point further closer to the vessel body 10D, thereby allowing a shorter portion of the cell introducing tube 20 to remain after the fusion cutting.

The cell preserving vessel 1D of the sixth embodiment achieves the following effect, in addition to the effects (1) to (6) described above.

(14) The pair of tube protecting parts 40D are joined to each other at one side extending along the direction in which the cell introducing tube 20 extends. With this feature, as shown in FIG. 13, the pair of tube protecting parts 40 can be opened and peeled off each other in the width direction (in the lateral direction), so that the cell introducing tube 20 can be suitably exposed up to the joined portion between the cell introducing tube 20 and the vessel body 10D. Thus, the cell introducing tube 20 can be fused and cut off at a point further closer to the vessel body 10D, thereby allowing a shorter portion of the cell introducing tube 20 to remain after the fusion cutting.

In the foregoing, preferred embodiments of the cell preserving vessel of the present invention have been described. However, the present invention is not limited to the above-described embodiments, but may be modified as appropriate. In the embodiments described above, the pair of tube protecting parts differ from each other in length in the extension direction. However, the present invention is not limited to this. Specifically, the pair of tube protecting parts may differ from each other in length in the width direction.

In the second embodiment, the cell accommodating part 11A is formed to have an elliptical shape in planar view. However, the present invention is not limited to this. For example, the cell accommodating part may have a circular shape in planar view.

In the second embodiment, the cell accommodating part 11A is formed to have an elliptical shape in planar view, and the cell introducing tube 20 is connected to one end portion of the major axis. However, the present invention is not limited to this. Specifically, the cell accommodating part may be formed such that a half portion thereof to which the cell introducing tube is connected has a semi-elliptical shape, and another portion thereof on which the port member is arranged has a different shape (e.g., a semi-circular shape or a cylindrical shape). That is to say, it is suitable that the cell accommodating part has an inner surface shape without corners that prevent air bubble from rising in a state where the side to which the cell introducing tube is connected is positioned upward.

In the second embodiment, the seal part 12A has a rectangular shape in planar view. However, the present invention is not limited to this. Specifically, a portion of the seal part 12A (e.g., an approximately half portion adjacent to the port member 30) may be formed in conformity with the shapes of the cell accommodating part 11A and the recesses 52A and 62A.

In the fifth embodiment, the retaining part 70 is composed of the pair of retaining strips 71 and the pair of retaining slits 72. However, the present invention is not limited to this. Specifically, for example, the pair of tube protecting parts may have, in each of lateral edges thereof, a slit formed in a width direction, and the tube protecting parts may be retained by engaging these slits with each other.

Figure 14:
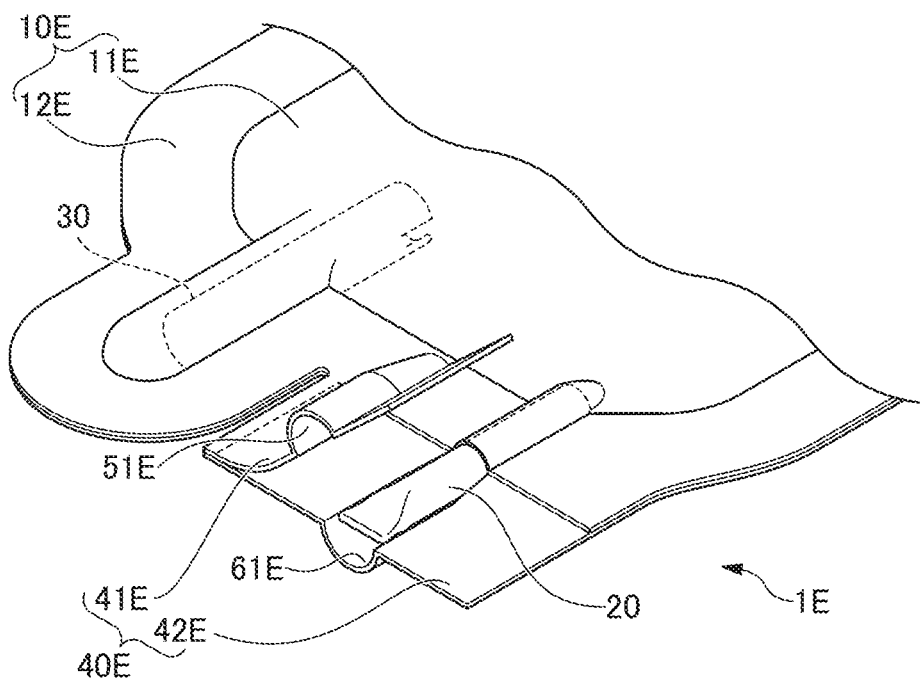
FIG. 14 is a perspective view showing a modification of the cell preserving vessel according to the sixth embodiment.

In the sixth embodiment, the pair of tube protecting parts 40D are joined to each other at one side extending along the direction in which the cell introducing tube 20 extends, and the pair of tube protecting parts 40D and the vessel body 10D are separated from each other in the portions other than the portion where the pair of tube protecting parts 40 are joined to each other. However, the present invention is but not limited to this. Specifically, as shown in FIG. 14, only one of the pair of tube protecting parts 40 (e.g., a first tube protecting part 41E) may be separated from the vessel body 10E.

Figure 15:
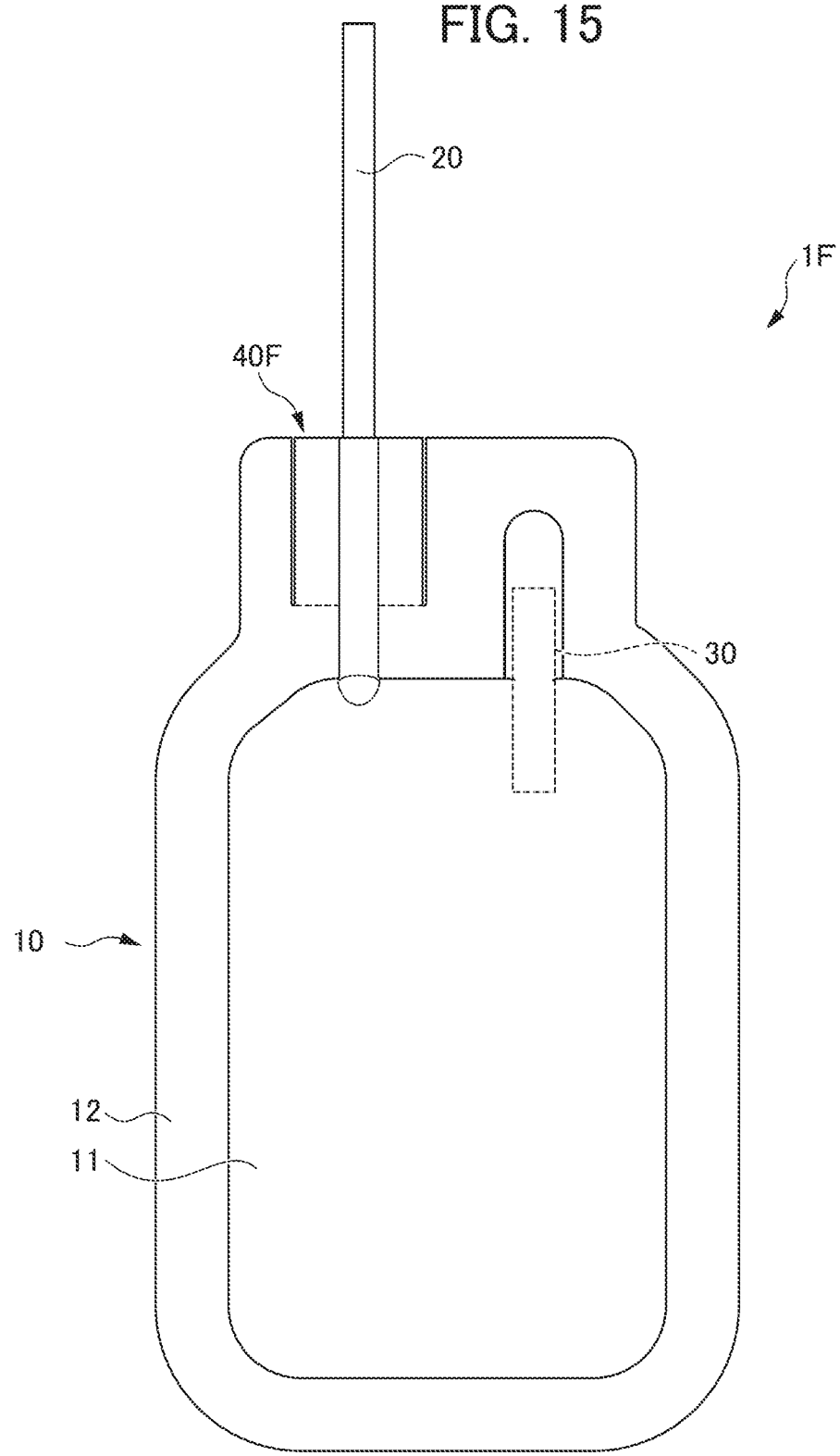
FIG. 15 is a plan view showing a modification of the cell preserving vessel according to the first embodiment.

The shape of the tube protecting parts 40 is not limited to the shapes described in the above embodiments. For example, a configuration shown in FIG. 15 is conceivable. In this configuration, a first sheet member and a second sheet member have, on a side where the cell introducing tube 20 and the port member 30 are arranged, extended portions in the same or similar size. The first and second sheet members are joined to each other except portions to form a tube protection part 40F. Thereafter, a cut is made along each of the boundaries between the tube protecting part 40F and the joined portions. In this manner, a cell preserving vessel 1F can be formed.

Figure 16:
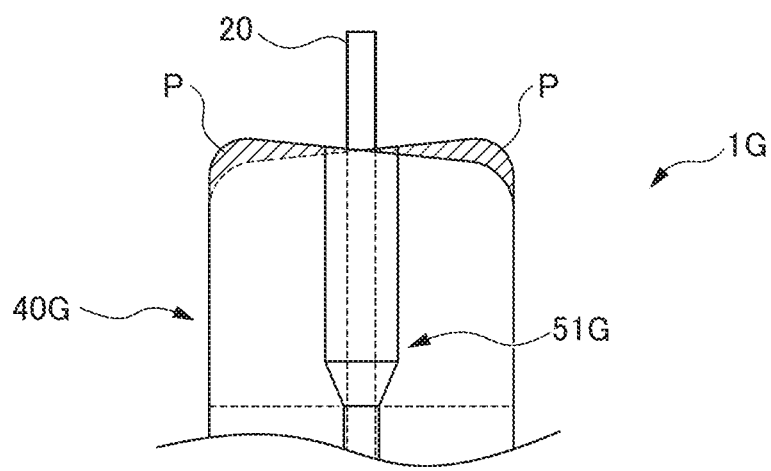
FIG. 16 is a plan view showing a modification of the cell preserving vessel according to the second embodiment.

In each of the above-described embodiments, the pair of tube protecting parts differ from each other in size. However, the present invention is not limited to this. For example, FIG. 16 shows a cell preserving vessel for storing a small quantity of cells as in the second embodiment. As shown in FIG. 16, a pair of tube protecting parts 40G may have the same shape and may each include a non-overlapping portion.

The cell preserving vessel 1G according to the modification shown in FIG. 16 can be produced in the following manner. First, two sheet members are both cut into an equally sized rectangular shape having an oblique side at one longitudinal end thereof. Next, in each of the two cut sheet members, a three-dimensionally shaped portion is formed. In this case, the three-dimensional shaped portion is formed so that in a state where the two sheet members are superposed together with their oblique sides crossing each other, the three-dimensional shaped portion constitutes a recess on a side that is to form the inner surface. Next, the two sheet members each having the three-dimensionally shaped portion are joined to each other while the two sheet members are superposed together with their oblique sides crossing each other. Specifically, the two sheet members are joined to each other at portions that are included in an area to constitute a vessel body (not shown) and that exclude the three-dimensionally shaped portions (whereas the two sheet members are left without being joined in portions that are to form the tube protecting parts 40G). In this manner, the cell preserving vessel 1G is produced, which has non-overlapping potions P that are located in extension end portions of the pair of the protecting parts 40G and that are each configured not to overlap with the counterpart sheet member.

According to the modification described above, the cell preserving vessel 1G can be produced using sheet members of the same type cut into the same shape, the cell preserving vessel 1G including the tube protecting parts 40G having the non-overlapping portions P that do not overlap with each other. The cell preserving vessel 1G thus configured has operability improved due to the non-overlapping potions P and can be produced using a reduced number of components.

EXPLANATION OF REFERENCE NUMERALS 1, 1A, 1B, 1C, 1D, 1E, 1F, 1G: Cell Accommodating Vessel
10, 10A, 10B, 10C, 10D, 10E: Vessel Body
11: Cell Accommodating Part
20: Cell Introducing Tube
40, 40A, 40B, 40C, 40D, 40E, 40F, 40G: Tube Protecting Part
50: First Sheet Member (Sheet Member)
51, 51A: Recessed Groove
61, 61A: Recessed Groove
60: Second Sheet Member (Sheet Member)
70: Retaining Part

The invention claimed is:
1. A cell preserving vessel comprising:
a vessel body which is made of a flexible resin member and has a cell accommodating part;
a cell introducing tube which is connected to the vessel body and through which cells are introduced into the cell accommodating part; and
a pair of tube protecting parts which are arranged to hold the cell introducing tube therebetween and protect a vicinity of a joined portion of the cell introducing tube, the joined portion being joined to the vessel body,
wherein the pair of tube protecting parts are not sealed to each other except at a bottom of each of the pair of tube protecting parts, and
wherein the cell introducing tube extends further than the pair of tube protecting parts in a direction away from the vessel body in a state in which the pair of tube protecting parts in entirety extend in the direction away from the vessel body.
2. The cell preserving vessel according to claim 1, wherein the vessel body is made of sheet members superposed on each other and joined to each other at peripheral margins thereof, and the tube protecting parts are extended from a peripheral margin of the vessel body.

3. The cell preserving vessel according to claim 2, wherein the tube protecting parts are constituted by the sheet members forming the vessel body.

4. The cell preserving vessel according to claim 1, wherein the tube protecting parts have a recessed groove formed thereon, the recessed groove corresponding to an outline shape of the cell introducing tube.

5. The cell preserving vessel according to claim 4, wherein the recessed groove is larger than the outline shape of the cell introducing tube.

6. The cell preserving vessel according to claim 1, wherein the tube protecting parts further include a retaining part which keeps the tube protecting parts in a state in which the cell introducing tube is held therebetween.

7. The cell preserving vessel according to claim 1, wherein the pair of tube protecting parts differ from each other in size.

8. The cell preserving vessel according to claim 1, wherein the pair of tube protecting parts have an identical shape and include a non-overlapping portion.

9. The cell preserving vessel according to claim 1, wherein the vessel body is made of sheet members superposed on each other and joined to each other at peripheral margins thereof, and has a seal part extending outward from the cell accommodating part, and the cell accommodating part is formed by shaping the sheet members three-dimensionally such that an inner wall of the cell accommodating part has a curvilinear shape in cross section.

10. The cell preserving vessel according to claim 9, wherein the cell accommodating part is formed such that a cross-sectional shape thereof in a plane direction and a cross-sectional shape thereof in a thickness direction are elliptical.

11. The cell preserving vessel according to claim 9, wherein the cell introducing tube is connected to the cell accommodating part at an end portion of a major axis of the cell accommodating part.

12. The cell preserving vessel according to claim 11, further comprising a cell outlet part which is arranged on the cell accommodating part at an end portion opposite to the end portion where the cell introducing tube is connected.

13. The cell preserving vessel according to claim 9, wherein the seal part has a rectangular shape in planar view.

* * * * *